(12) United States Patent
Plett et al.

(10) Patent No.: US 8,469,409 B2
(45) Date of Patent: *Jun. 25, 2013

(54) OVERSTROKE LATCH ASSEMBLY

(75) Inventors: Matthew Plett, Worthington, OH (US); Steven Thiele, Marysville, OH (US); Kenichi Kitayama, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1083 days.

This patent is subject to a terminal disclaimer.

(21) Appl. No.: 11/756,565

(22) Filed: May 31, 2007

(65) Prior Publication Data

US 2007/0222230 A1 Sep. 27, 2007

Related U.S. Application Data

(63) Continuation-in-part of application No. 10/894,631, filed on Jul. 20, 2004, now Pat. No. 7,243,973.

(60) Provisional application No. 60/583,661, filed on Jun. 29, 2004.

(51) Int. Cl.
*E05C 3/06* (2006.01)
*E05C 3/16* (2006.01)

(52) U.S. Cl.
USPC .................... 292/216; 292/201; 292/DIG. 23

(58) Field of Classification Search
USPC .................... 292/201, 216, DIG. 23
See application file for complete search history.

(56) References Cited

U.S. PATENT DOCUMENTS

| 3,387,406 | A |  | 6/1968  | Coker et al. |
|-----------|---|--|---------|--------------|
| 3,400,961 | A |  | 9/1968  | Koch et al. |
| 3,454,299 | A |  | 7/1969  | Hewitt et al. |
| 3,592,504 | A |  | 7/1971  | Sandor |
| 3,623,764 | A |  | 11/1971 | Jacobus |
| 3,645,043 | A |  | 2/1972  | Velavicius et al. |
| 4,076,301 | A |  | 2/1978  | Gergoe |
| 4,203,621 | A | * | 5/1980  | Noel et al. .................... 292/216 |
| 5,413,402 | A |  | 5/1995  | Flerchinger et al. |
| 5,868,444 | A | * | 2/1999  | Brackmann et al. .......... 292/201 |
| 5,947,536 | A |  | 9/1999  | Mizuki et al. |
| 6,017,067 | A |  | 1/2000  | Yoneyama et al. |
| 6,113,161 | A |  | 9/2000  | Jung et al. |
| 6,175,202 | B1 |  | 1/2001  | Weyerstall et al. |
| 6,471,259 | B1 |  | 10/2002 | Weyerstall et al. |
| 6,779,820 | B2 | * | 8/2004  | Ogino .......................... 292/216 |
| 6,938,941 | B2 |  | 9/2005  | Thiele et al. |
| 7,111,877 | B2 | * | 9/2006  | Larsen et al. ................ 292/216 |
| 7,111,878 | B2 | * | 9/2006  | Kachouh ...................... 292/216 |
| 7,165,800 | B2 | * | 1/2007  | Thiele et al. .................... 296/50 |
| 7,243,973 | B2 | * | 7/2007  | Plett et al. .................... 296/57.1 |
| 7,258,373 | B2 | * | 8/2007  | Plett et al. .................... 292/210 |

* cited by examiner

*Primary Examiner* — Carlos Lugo
(74) *Attorney, Agent, or Firm* — Mark E. Duell; Rankin, Hill & Clark LLP

(57) ABSTRACT

A closure assembly is mounted on a vehicle and moveable between a closed position and at least one open position. The closure assembly includes a closure structure mounted to an associated vehicle for movement between the closed position and the at least one open position. A first lock assembly is selectively locking the closure structure to the associated vehicle. A second lock assembly is selectively locking the closure structure to the associated vehicle. One of the first and second lock assemblies includes a latch that requires overstroking to lock the latch in a latched position.

21 Claims, 9 Drawing Sheets

OVERSTROKE LATCH ASSEMBLY

This application is a divisional of U.S. application Ser. No. 10/894,631 filed on Jul. 20, 2004, which is expressly incorporated herein by reference and itself claims priority of Provisional Patent Application Ser. No. 60/583,661, filed Jun. 29, 2004, entitled "Overstroke Latch Assembly."

BACKGROUND

The present invention relates to a latch assembly on a vehicle's door, tailgate or other closure structure and, more particularly, to a latch assembly that requires overstroking to latch onto a striker for locking a door, tailgate or other closure structure in a closed position. The present invention finds particular application as a latch or lock assembly on a tailgate and, more specifically, a dual-mode tailgate and will be described with particular reference thereto. It is to be appreciated, however, that the invention may relate to other similar environments and applications.

Tailgates and, more particularly, dual-mode tailgates are generally known. For example, U.S. Pat. No. 3,387,406 issued to Coker discloses a dual-mode tailgate for use on a station wagon. "Dual-mode" refers to the two directions or pivot axes along which a dual-mode tailgate is openable. More particularly, a dual-mode tailgate is selectively openable in a first, fold-down direction about an axis generally parallel with a bottom edge of the tailgate similar to a conventional pick-up truck tailgate. The dual-mode tailgate is also selectively openable in a second, side-to-side direction about an axis generally parallel with a lateral edge of the tailgate.

Generally, a dual-mode tailgate includes a dual-mode hinge pivotally connecting the tailgate to a vehicle, a first hinge/lock assembly spaced apart from the dual-mode hinge in a first direction and a second hinge/lock assembly spaced apart from the dual-mode hinge in a second direction. For example, the dual-mode hinge is positioned in a lower-left corner of the tailgate, the first hinge/lock assembly is positioned in a lower-right corner of the tailgate and the second hinge/lock assembly is positioned in an upper-left corner of the tailgate.

When the first hinge/lock is detached from the vehicle, the tailgate is openable in a first mode (e.g., swing-open mode) wherein the second hinge/lock and the dual-mode hinge cooperate to pivotally connect the tailgate to the vehicle along a first axis (e.g., an axis generally parallel with a lateral edge of the tailgate). When the second hinge/lock is detached from the vehicle, the tailgate is openable in a second mode (e.g., flip-down mode) wherein the first hinge/lock assembly and the dual-mode hinge cooperate to pivotally connect the tailgate to the vehicle along a second axis (e.g., an axis generally parallel with a bottom edge of the tailgate). Often, a conventional lock assembly is provided in a corner of the tailgate cater-corner or diagonally opposite the dual-mode hinge to further secure the tailgate to the vehicle when the tailgate is in a closed position.

To prevent damage to the vehicle and the tailgate, as well as injury to an operator of the tailgate, the dual-mode tailgate is preferably prevented from operating in both of its modes simultaneously, i.e., the first and second hinge/lock assemblies are not allowed to both be detached from the vehicle simultaneously. In some vehicles, sensors are employed for determining whether the first and second hinge/lock assemblies are in respective locked positions, i.e., securing the tailgate to the vehicle. In these vehicles, one of the first and second hinge/lock assemblies is only allowed to be unlocked and detached from the vehicle when a sensor indicates the other of the first and second hinge/lock assemblies is locked and secured to the vehicle. Typically, sensors are needed at each hinge/lock assembly for determining the state, locked or unlocked, of each hinge/lock assembly. Employing multiple sensors increases the cost and ease of manufacture of the tailgate's control system. Accordingly, there is a need for a simplified latch assembly that can be used in a dual-mode tailgate with a single sensor to assist in preventing the tailgate from opening in two modes simultaneously.

SUMMARY

In accordance with one aspect, a closure assembly is mounted on a vehicle and moveable between a closed position and at least one open position. More particularly, in accordance with this aspect, the closure assembly includes a closure structure mounted to an associated vehicle for movement between the closed position and the at least one open position. A first lock assembly selectively locks the closure structure to the associated vehicle. A second lock assembly also selectively locks the closure structure to the associated vehicle. One of the first and second lock assemblies includes a latch that requires overstroking to lock the latch in a latched position.

In accordance with another aspect, a tailgate assembly is provided that is adapted to be mounted along an open edge of a vehicle's load-carrying bed wherein the tailgate is able to alternatively pivot about (1) a first axis generally parallel with a bottom edge of the tailgate for movement between a closed position and a fold-open position and (2) a second axis generally parallel with a first lateral edge of the tailgate for movement between the closed position and a swing-open position. More particularly, in accordance with this aspect, the tailgate assembly includes a tailgate selectively closing an open end of an associated vehicle load-carrying bed. A dual-mode hinge assembly is mounted to the tailgate adjacent a first corner of the tailgate. A locking assembly is mounted to the tailgate adjacent a second corner of the tailgate. The locking assembly is selectively latched to an associated locking striker of the associated load-carrying bed.

A first hinge/lock assembly is mounted to the tailgate adjacent a third corner of the tailgate. The first hinge/lock assembly is selectively latched to an associated first hinge/lock striker of the associated load-carrying bed and cooperates with the dual-mode hinge assembly to pivotally support the tailgate about a first pivot axis. A second hinge/lock assembly is mounted to the tailgate adjacent a fourth corner of the tailgate. The second hinge/lock assembly is selectively latched to an associated second hinge/lock striker of the associated load-carrying bed and cooperates with the dual-mode hinge assembly to pivotally support the tailgate about a second pivot axis.

The tailgate is openable to the fold-open position when the second hinge/lock assembly and the locking assembly are unlatched from respective associated strikers and openable to the swing-open position when the first hinge/lock assembly and the locking assembly are unlatched from respective associated strikers. The locking assembly latches to the associated locking striker (1) after the second hinge/lock assembly latches to the associated second hinge/lock striker when the tailgate is moved from the fold-open position to the closed position and (2) after the first hinge/lock assembly latches to the associated first hinge/lock striker when the tailgate is moved from the swing-open position to the closed position.

According to yet another aspect, a dual-mode tailgate assembly is provided having a tailgate mounted to an associated vehicle. The tailgate is moveable from a closed position to a first open position and alternatively a second open position. More particularly, in accordance with this aspect, the dual-mode tailgate assembly includes a dual-mode hinge pivotally connected to the associated vehicle for movement about a first axis and alternative movement about a second axis. A first hinge/lock assembly is releasably locked to the associated vehicle and spaced from the dual-mode hinge in a first direction. A second hinge/lock assembly is releasably locked to the associated vehicle and spaced from the dual-mode hinge in a second direction.

The tailgate is openable in a first direction to the first open position when (i) the first hinge/lock assembly is detached from the associated vehicle and (ii) the second hinge/lock and the dual-mode hinge pivotally connect to the associated vehicle. The tailgate is openable in a second direction to the second position when (i) the second hinge/lock is detached from the associated vehicle and (ii) the first hinge/lock and the dual-mode hinge pivotally connect to the associated vehicle. A means is provided for preventing (1) the first hinge/lock assembly from releasing from the associated vehicle when the second hinge/lock is released from the associated vehicle and (2) the second hinge/lock assembly from releasing from the associated vehicle when the first hinge/lock is released from the associated vehicle.

According to still another aspect, a latch assembly is provided for use with a striker in latching first and second bodies together when at least one of the bodies is movable relative to the other of the bodies. The striker is mounted to one of the bodies and the latch assembly to the other of the bodies. More particularly, in accordance with this aspect, the latch assembly includes a latch having a latch recess. The striker is moveable into and from the latch recess when the latch is in an unlatched position. The latch is moveable to a latched position wherein the latch locks onto the striker thereby latching the bodies together. A ratchet is moveable between (1) an engaged position wherein the ratchet holds the latch in the latched position and (2) a disengaged position wherein the ratchet allows the latch to move between the unlatched and the latched positions. The ratchet is only moveable from the disengaged position to the engaged position when the latch is overstroked.

BRIEF DESCRIPTION OF THE DRAWINGS

The invention may take form in various components and arrangements of components, and in various steps and arrangements of steps. The drawings are only for purposes of illustrating a preferred embodiment of the invention and are not to be construed as limiting the invention.

DETAILED DESCRIPTION

Figure 1:
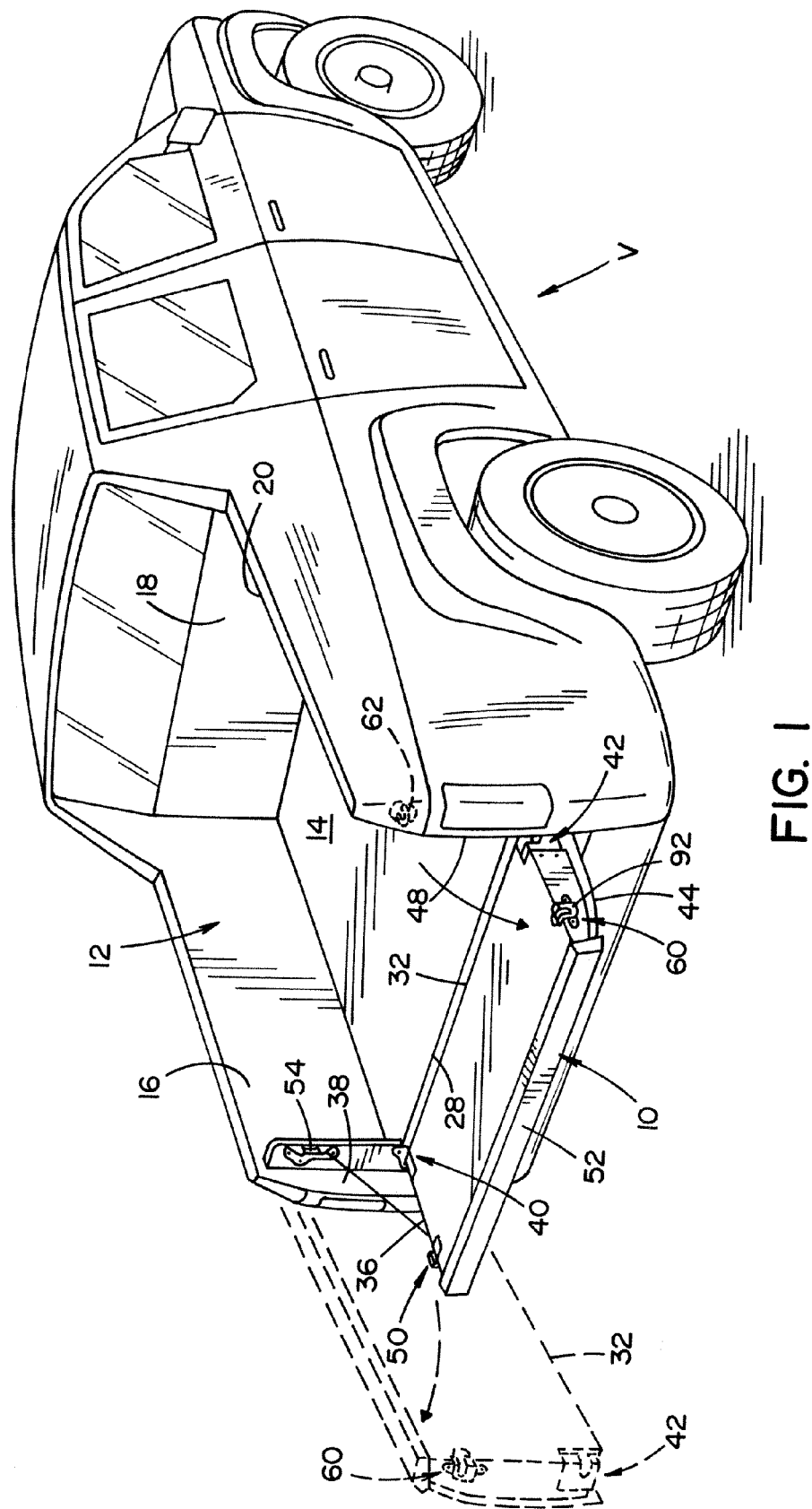
FIG. 1 is a perspective view of a vehicle having a dual-mode tailgate openable in (1) a first, fold-down direction and (2) a second, side-to-side direction.

Referring now to the drawings wherein the showings are for purposes of illustrating one or more embodiments only and not for purposes of limiting the same, with reference to FIG. 1, a closure structure or assembly, such as dual-mode tailgate 10, is shown as a component of a load-carrying bed 12 of a vehicle V. In the illustrated embodiment, the vehicle is a sport utility truck (SUT), but it is to be appreciated by those skilled in the art that the vehicle V could be any other type of vehicle having a bed, such as a pick-up truck, utility truck or other vehicle. Generally, the bed 12 includes a bed floor 14 having a plurality of walls 16,18,20 extending upwardly adjacent three edges thereof and forming a portion of a vehicle body of the vehicle V.

The dual-mode or dual-axis tailgate 10 is positioned along an open, rear edge 28 of the bed floor 14. More particularly, the tailgate 10 extends between the first and second sidewalls 16,20 to selectively close an open end of the load-carrying bed 12. The tailgate 10 is mounted to the vehicle V and is able to pivot about a first axis 30 (FIG. 2) for movement between a closed position and a fold-open position. In the illustrated embodiment, the first axis 30 is generally horizontal and parallel with the rear edge 28 of the bed floor 14 and a bottom edge 32 of the tailgate 10. The tailgate 10 is also alternatively able to pivot about a second axis 34 (FIG. 2) for movement between the closed position and a swing-open position. In the illustrated embodiment, the second axis 34 is generally vertical and parallel with a first lateral edge 36 of the tailgate and a first sidewall end 38.

Figure 2:
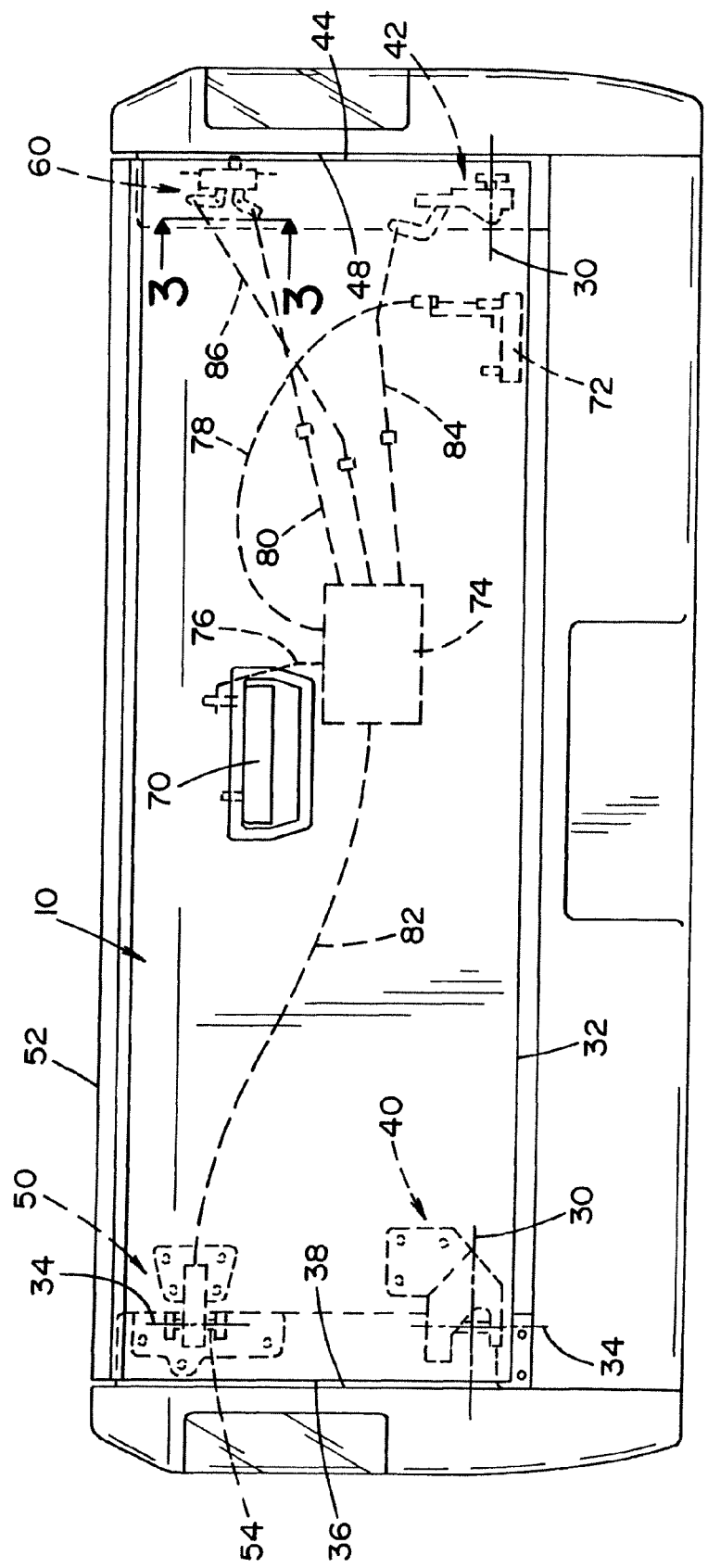
FIG. 2 is a rear elevational view of the tailgate on the vehicle.

To facilitate the dual-mode action of the tailgate 10, with additional reference to FIG. 2, a dual-mode hinge assembly 40 attaches or is mounted to the tailgate 10 at or adjacent a first corner of the tailgate formed at the intersection of the bottom edge 32 and the first lateral edge 36 of the tailgate 10. The dual-mode hinge assembly 40 pivotally connects the tailgate 10, along the first and second axes 30,34, to the vehicle V. More specifically, the dual-mode hinge assembly 40 pivotally connects to the first sidewall end 38 adjacent the rear edge 28 of the bed floor 14 for movement about the first axis 30 and alternative movement about the second axis 34. In one embodiment, the dual-mode hinge assembly is that described in commonly owned, U.S. patent application Ser. No. 10/663,581, entitled "Tailgate Dual Mode Hinge With Integrated Checker" and filed on Sep. 16, 2003, expressly incorporated herein by reference.

A first hinge/lock assembly 42 attaches or is mounted to the tailgate 10 spaced from the hinge assembly 40 in a first direction. More specifically, the hinge/lock assembly 42 is mounted at or adjacent a second corner of the tailgate formed at the intersection of the bottom edge 32 and a second lateral edge 44 of the tailgate 10. The first hinge/lock assembly 42 selectively latches or locks to a first hinge/lock striker (not shown) to releasably lock the tailgate 10 to the vehicle V. The first hinge/lock striker is mounted to or adjacent a second sidewall end 48 adjacent the rear edge 28 of the bed floor 14. When operating as a hinge, the first hinge/lock assembly 42 cooperates with the hinge assembly 40 to pivotally support the tailgate 10 along or about the first axis 30 and allows the tailgate to move between the tailgate closed position and the fold-open position.

A second hinge/lock assembly 50 attaches or is mounted to the tailgate 10 spaced from the hinge assembly 40 in a second direction. More specifically, the hinge/lock assembly 50 is mounted at or adjacent a third corner of the tailgate formed at the intersection of the first lateral edge 36 and a top edge 52 of the tailgate. The second hinge/lock assembly 50 selectively latches or locks to a second hinge/lock striker 54 to releasably lock the tailgate 10 to the vehicle V. The second hinge/lock striker 54 is mounted to or adjacent an upper portion of the first sidewall end 38. The second hinge/lock assembly 50 cooperates with the hinge assembly 40 to pivotally support the tailgate 10 along or about the second axis 34 and allows the tailgate to move between the tailgate closed position and the swing-open position.

Figure 3:
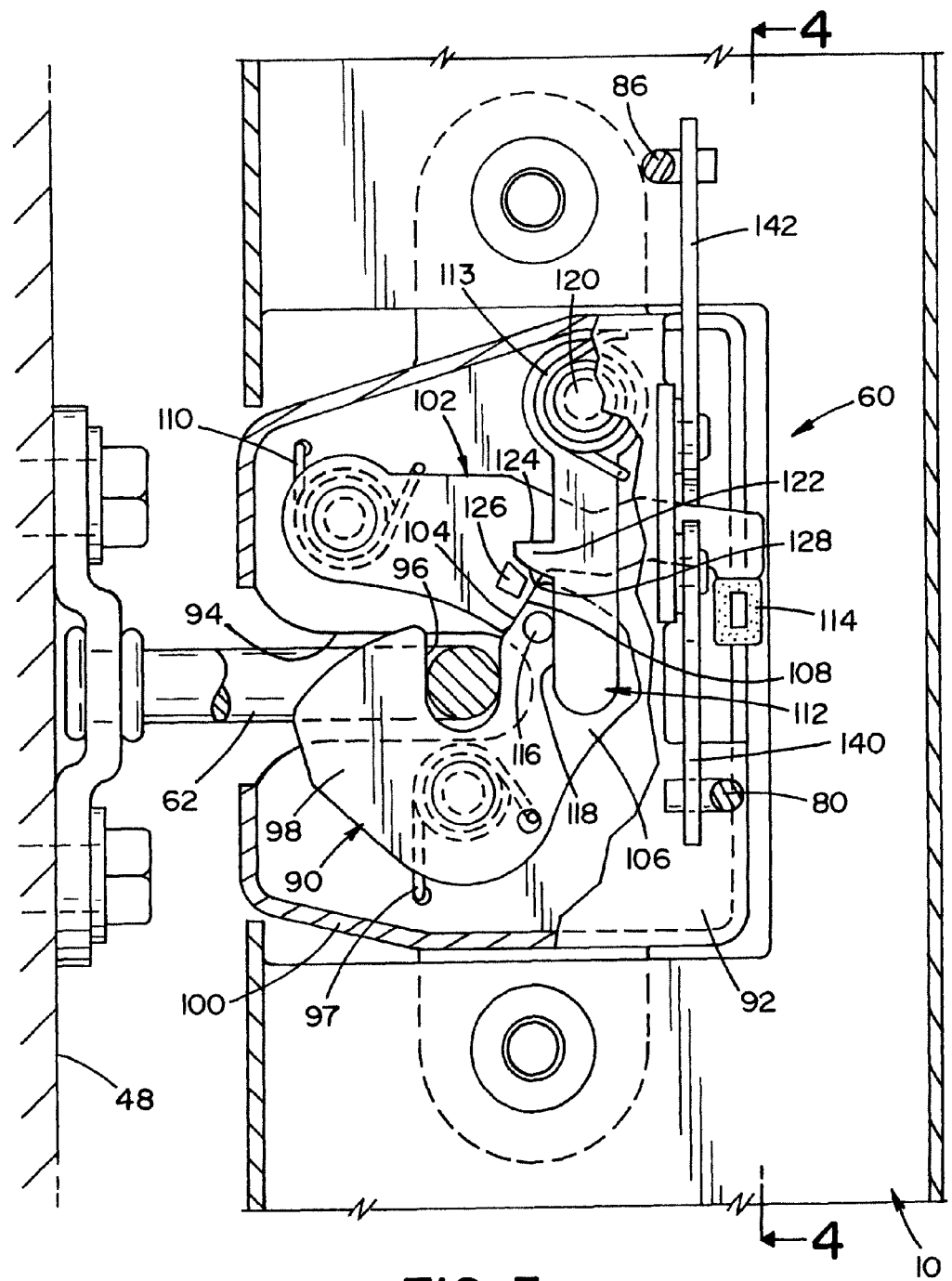
FIG. 3 is a cross-sectional view of a lock assembly taken along the line 3-3 of FIG. 2.
Figure 4:
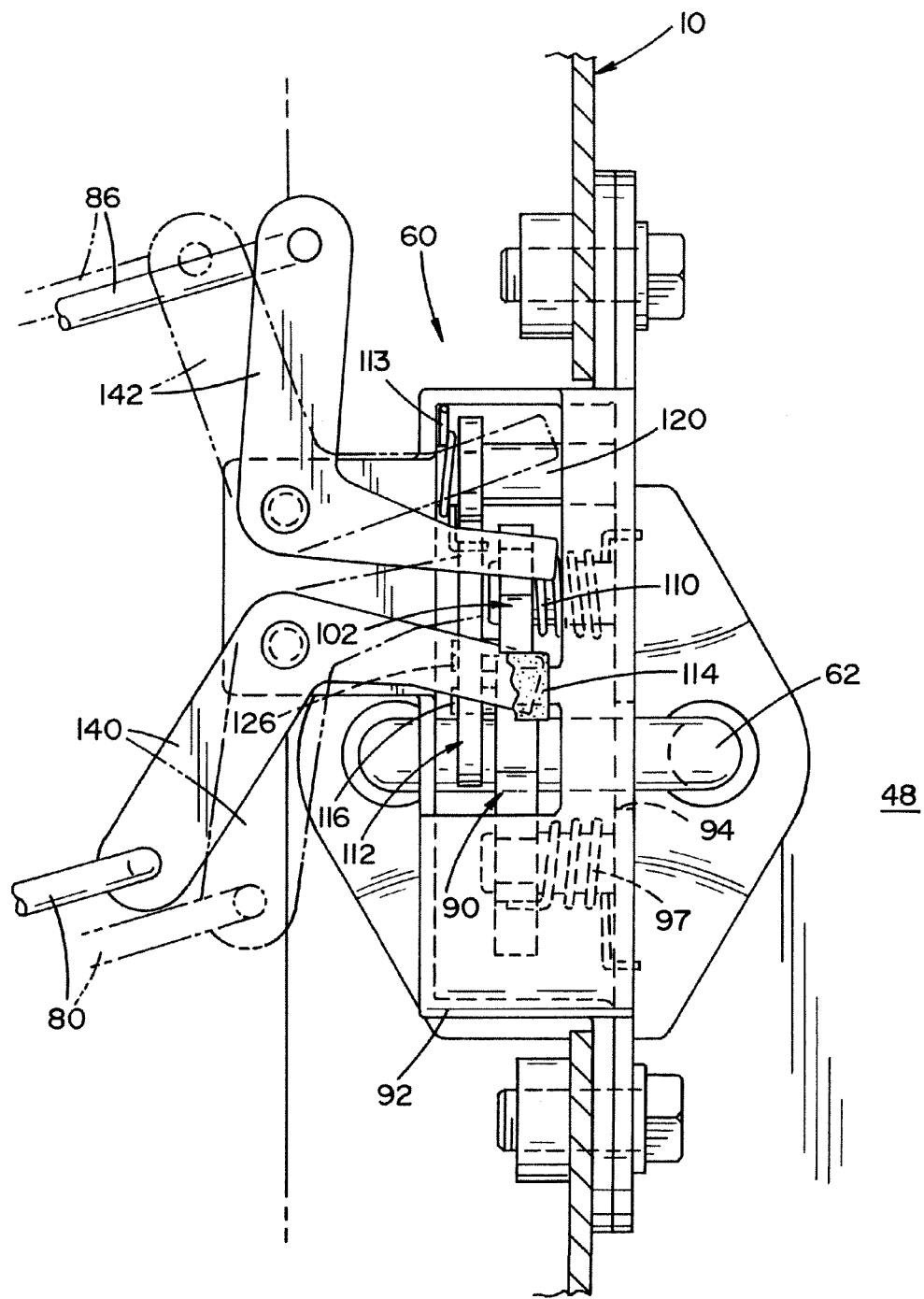
FIG. 4 is a cross-sectional view of the lock assembly taken along the line 4-4 of FIG. 3.
Figure 5:
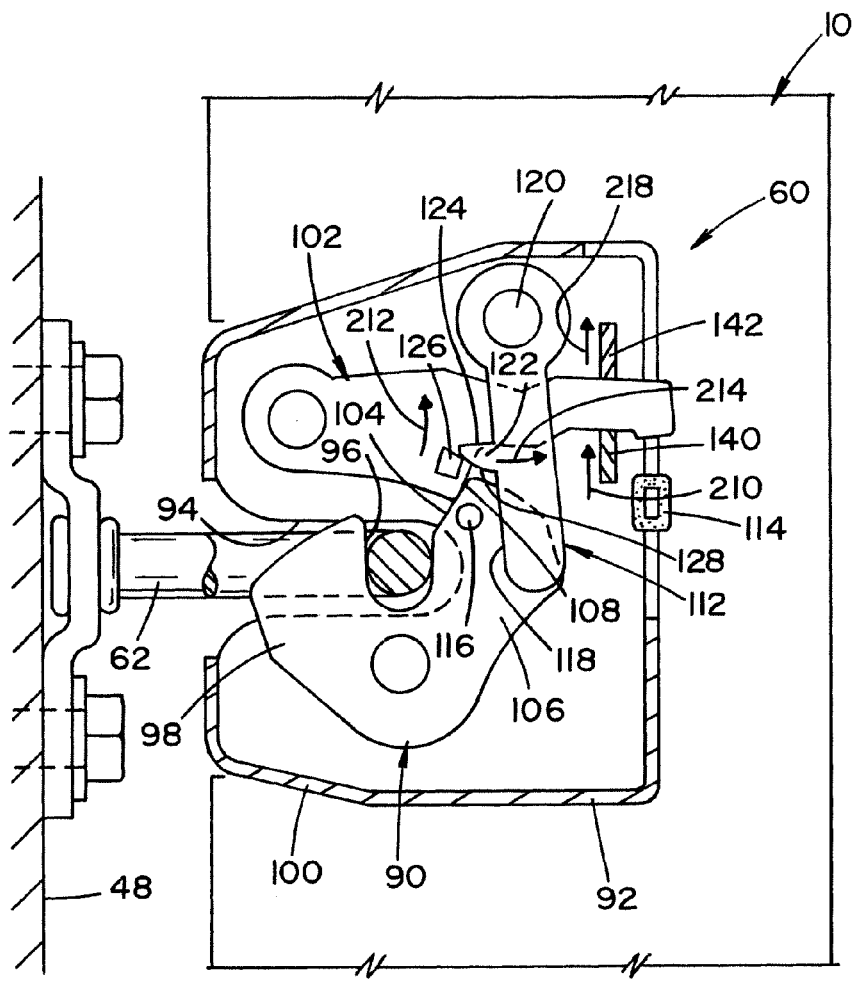
FIG. 5 is a schematic view of the lock assembly of FIG. 3 showing the locking assembly being unlocked from a striker.

A lock or locking assembly 60 attaches or is mounted to the tailgate 10 at or adjacent a fourth corner of the tailgate formed at the intersection of the top edge 52 and the second lateral edge 44 of the tailgate. The locking assembly 60 selectively latches to a locking striker 62 (FIG. 3) to releasably lock the tailgate to the vehicle V. The striker 62 is mounted to or adjacent an upper portion of the second sidewall end 48. The tailgate 10 is openable toward or to the fold-open position when both the second hinge/lock assembly 50 is unlatched from the second hinge/lock striker 54 and the locking assembly 60 is unlatched from the locking striker 62. The tailgate 10 is openable toward or to the swing-open position when both the first hinge/lock assembly 42 is unlatched from the first hinge/lock striker and the locking assembly 60 is unlatched from the locking striker 62.

The tailgate 10 additionally includes a first or upper handle 70 and a second or lower handle 72. The upper handle 70 communicates with a synchronizer 74 through a rod or lever 76. The lower handle 72 communicates with the synchronizer 74 through a cable 78. The synchronizer 74 selectively allows the upper handle 70 to unlock the hinge/lock and locking assemblies 50,60 from their respective strikes when the upper handle 70 is pulled via rod 80 and cable 82. The synchronizer 74 also selectively allows the lower handle 72 to unlock the hinge/lock and locking assemblies 42,60 from their respective strikes when the lower handle is pulled via the rod 80 and rod 84. Thus, the synchronizer 74 selectively enables the upper handle 70 to open the tailgate 10 to the flip-down or fold-open position and the lower handle 72 to open the tailgate to the swing-open position.

From the fold-open position, the tailgate 10 is moveable toward or to the closed position. As the tailgate 10 moves into the closed position from the fold-open position, the second hinge/lock assembly 50 and the locking assembly 60 latch onto respective strikers 54,62 and, as will be discussed in more detail below, the locking assembly 60 latches onto the locking striker 62 only after the second hinge/lock assembly 50 latches onto the second hinge/lock striker 54 (or, stated in reverse, second hinge/lock assembly 50 latches onto striker 54 before or prior to locking assembly 60 latching onto striker 62). From the swing-open position, the tailgate 10 is moveable toward or to the closed position. As the tailgate 10 moves into the closed position from the swing-open position, the first hinge/lock assembly 42 and the locking assembly 60 latch onto their respective strikers (striker 62 for latch assembly 60) and, as will also be described in more detail below, the locking assembly 60 latches onto the locking striker 62 only after the first hinge/lock assembly 42 latches onto the first hinge/lock striker (or, stated in reverse, first hinge/lock assembly 42 latches onto its striker before or prior to locking assembly 60 latching onto striker 62).

To prevent damage to the vehicle V and/or the tailgate 10, as well as potential injury to a user of the tailgate, the tailgate 10 is prevented from operating in both of its modes (swing-open and fold-down) simultaneously. For this purpose, the second hinge/lock assembly 50 is prevented from unlatching from its striker 54 whenever the first hinge/lock assembly 42 is already unlatched from its striker. Similarly, the first hinge/lock assembly 42 is prevented from unlatching from its striker whenever the second hinge/lock assembly 50 is already unlatched from its striker 54. Moreover, the first and second hinge/lock assemblies 42,50 are prevented from both unlatching from their respective strikers at the same time. Thus, one of the first and second hinge/lock assemblies 42,50 is always latched onto its striker whenever the other of the first and second hinge/lock assemblies is unlatched from its striker.

Because the locking assembly 60 always latches after the first and second hinge/lock assemblies 42,50, the locking assembly 60 and, more particularly, the state of the locking assembly (i.e., latched or unlatched) are used to determine the status of the hinge/lock assemblies. If the locking assembly 60 is latched, then it is known that both the first and second hinge/lock assemblies 42,50 are latched. By example, if the tailgate 10 is opening toward the swing-open position or the fold-down position, the locking assembly 60 is unlatched with only one of the first and second hinge/lock assemblies 42,50. When the tailgate 10 is closed from either the swing-open position or the fold-down position, the lock assembly 60 latches only after the hinge lock assembly 42 or 50 (with which the lock assembly 60 was unlatched) latches. Since only one hinge/lock assembly 42,50 unlatches with the lock assembly 60 at any given time, whenever the lock assembly 60 re-latches, it is known that the unlatched hinge/lock assembly 42 or 50 has already been re-latched because the lock assembly 60 only latches after the unlatched hinge/lock assembly re-latches. Therefore, whenever the lock assembly is latched, it is known that the both the hinge/lock assemblies 42,50 are latched.

Conversely, whenever the lock assembly 60 is unlatched it is known that one of the hinge/lock assemblies 42,50 is unlatched. By example, if the locking assembly 60 is unlatched with the first hinge/lock assembly 42 to open the tailgate toward the swing-open position, the lock assembly 60 will not re-latch until the first hinge/lock assembly 42 re-latches. Similarly, if the locking assembly 60 is unlatched with the second hinge/lock assembly 50 to open the tailgate toward the fold-open position, the lock assembly 60 will not re-latch until the second hinge/lock assembly 50 re-latches. Thus, whenever the lock assembly 60 is unlatched, one of the hinge/lock assemblies 42,50 is known to be unlatched.

In the illustrated embodiment, a sensor rod 86 is used to communicate the status of the locking assembly 60 to the synchronizer 74. Based on the communicated status of the locking assembly 60, the synchronizer 74 selectively enables or disables the handles 70,72. As is known to those skilled in the art, the synchronizer 74 employs a series of pivotally mounted levers connected to the rods 76,80,84,86 and cables 78,82 for selectively enabling an disabling of the handles 70,72 based on the status of the locking assembly 60. When the sensor rod 86 indicates to the synchronizer 74 that the lock assembly 60 is latched, both handles 70,72 are enabled and either of the first and second hinge/lock assemblies 42,50 (but not both simultaneously) is allowed to be unlatched with the lock assembly 60 to open the tailgate 10 because, as already discussed, it is known that both hinge/lock assemblies are latched whenever the locking assembly 60 is latched. For example, provided the sensor rod 86 indicates the lock assembly 60 is latched, the synchronizer 74 enables the handles 70,72 so that pulling of the lower handle 72 unlatches both the first hinge/lock assembly 42 and the lock assembly 60 to open the tailgate to the swing-open position. Alternatively, with the handles 70,72 enabled, pulling of the upper handle 70 unlatches both the second hinge/lock 50 and the lock assembly 60 to open the tailgate to the fold-down position.

When the sensor rod 86 indicates that the lock assembly 60 is unlatched, both handles 70,72 are disabled by the synchronizer 74. For example, when the tailgate is opened with the lower handle 72 toward the swing-open position, the lock assembly 60 and the first hinge/lock assembly 42 are together unlatched. The sensor rod 86 indicates to the synchronizer 74 that the lock assembly 60 is unlatched and the synchronizer disables the handles 70,72. Thus, the upper handle 70 cannot be pulled to unlatch the second hinge/lock assembly 50. The lower handle 72 no longer needs to be enabled as the tailgate is already openable in the swing-open mode. When the tailgate is opened by the upper handle 70 toward the fold-down position, the lock assembly 60 and the second hinge/lock assembly 50 are together unlatched. The sensor rod 86 indicates to the synchronizer 74 that the lock assembly 60 is unlatched and the synchrozier disables the handles 70,72. Thus, the lower handle 72 cannot be pulled to unlatch the first hinge/lock assembly 42. The upper handle 70 no longer needs to be enabled as the tailgate is already operable in the flip-down mode. Once disabled, the handles 70,72 are not enabled again by the synchronizer 74 until the locking assembly 60 is overstroked and re-latched.

With additional reference to FIGS. 3-9, the locking assembly 60 includes a latch assembly having a latch 90 that requires an overstroke to latch or lock onto the striker 62. Having a latch that requires overstroking differs from at least most conventional vehicle locks, including those typically found on tailgates. Conventional vehicle locks may include latches that permit overstroking (and sometimes include means to correct or reverse such overstroking), but generally do not require overstroking to latch or lock onto a striker. Requiring overstroking enables either of the first and second hinge/lock assemblies 42,50, which include latches (not shown) that do not require overstroking, to sequentially latch or lock onto their respective strikers prior to the latch 90 latching or locking onto the striker 62. Thus, when the tailgate 10 is moved from the fold-open position to the closed position, the second hinge/lock assembly 50, which is unlatched along with the latch 90 of the locking assembly 60 when the tailgate is in the fold-open position, latches to its striker 54 before the overstroke of the latch 90 is completed which is necessary for the latch to latch or lock onto the striker 62. When the tailgate 10 is moved from the swing-open position to the closed position, the first hinge/lock assembly 42, which is unlatched along with the latch 90 of the locking assembly 60 when the tailgate is in the swing-open position, latches to its striker before the overstroke of the latch 90 is completed which is necessary for the latch to latch or lock onto the striker.

The locking assembly 60 further includes a lock body 92 to which the latch 90 is rotatably mounted. The lock body 92 defines a lock body recess 94 for receiving the locking striker 62 when the tailgate 10 is moved to the closed position from any open position, including the swing-open position and the fold-down position. The latch 90 includes a latch recess 96 for receiving the striker 62 when the latch is in an unlatched position (shown in FIG. 6) and the tailgate 10 is moved to the closed position from the open position. As will be described in more detail below, as the tailgate 10 is moved to the closed position and the striker 62 is received in the recesses 94,96, the striker 62 causes the latch 90 to move and, specifically, rotate about the striker 62 to a latched position wherein the latch 90 locks the striker 62 in the lock body 92. When the latch 90 is in the unlatched position, the striker 62 is moveable into and from the recesses 94,96.

The latch 90 is rotatably urged in a first rotatable direction (counterclockwise in FIG. 3) by a biasing means, such as torsion spring 97. More specifically, the latch 90 is rotatably urged toward the unlatched position (the position shown in FIG. 6). Engagement between a first leg 98 of the latch 90 and a wall 100 of the lock body 92 prevents the latch from rotating beyond the unlatched position. The latch 90 is rotatably moveable in a second rotatable direction (clockwise in FIG. 3) by and about the striker 62 to the latched position (the position shown in FIG. 3) when the tailgate 10 is moved from any open position to the closed position.

A ratchet 102 is rotatably mounted to the lock body 92 adjacent the latch 90. The ratchet 102 is rotatably moveable between a disengaged position (the position shown in FIG. 6) and an engaged position (the position shown in FIG. 3). In the disengaged position, the ratchet 102 does not obstruct the latch 90 from rotating in either of the first and second rotatable directions. When the ratchet 102 is in the engaged position, the latch 90 can be held in the latched position. More particularly, when the latch 90 is rotated in second direction to or past the latched position and the ratchet 102 moves to the engaged position, the ratchet holds the latch in the latched position against the urging of the biasing means 97 which urges the latch to rotate in the first direction toward the unlatched position.

Specifically, the latch 90 includes a catch surface 104 on a second leg 106 of the latch that engages or cooperates with an opposing catch surface 108 of the ratchet 102 to hold the latch in the latched position. Thus, the ratchet 102 can hold the latch 90 in the latched position wherein the latch can lock the striker 62 to the lock body 92. As will be described in more detail below, the ratchet 102 is only moveable from the disengaged position to the engaged position when or after the latch 90 is overstroked. Thus, the latch 90 is not held in the latched position until the latch is overstroked to move the ratchet 102 to the engaged position. Overstroking the latch 90 requires the latch to be moved in the second direction past the latched position to an overstroked position (position shown in FIG. 8).

A ratchet guide lever 112 is also rotatably mounted to the lock body 92 adjacent the ratchet 102. The ratchet guide lever 112 is rotatably moveable between a holding position (the position shown in FIGS. 3 and 6) and a release position (the position shown in FIG. 8). In the holding position, the ratchet guide lever 112 will hold the ratchet 102 in the disengaged position provided the ratchet 102 is in the disengaged position. In the release position, the ratchet guide lever 112 allows (i.e., does not obstruct) the ratchet 102 to move from the disengaged position to the engaged position. The ratchet 102 is rotatably urged in the second direction (clockwise in FIG. 3) by a biasing means, such as torsion spring 110, toward or to the disengaged position. Alternatively, the ratchet 102 can be oriented such that gravity urges the ratchet in the second direction. Thus, when the ratchet guide lever 112 is in the release position, the ratchet 102 is urged to or toward the engaged position. A stopper 114 limits movement of the ratchet 102 in the second direction at the engaged position, i.e., the spring 110 acts on the ratchet to move the ratchet toward the engaged position but the stopper prevents the ratchet 102 from moving in the second direction past the engaged position.

The ratchet guide lever 112 is rotatably urged in the second direction (clockwise in FIG. 3) by a biasing means, such as torsion spring 113, toward or to the holding position. Alternatively, the ratchet guide lever 112 can be oriented such that gravity urges the lever 112 toward the holding position. Thus, when the ratchet guide lever 112 is in the release position, the spring 113 urges the lever 112 in second direction toward or to the holding position. The lever 112 is limited from moving beyond the holding position in the second direction by at least one of a raised portion 116 of the latch 90 and a raised portion 126 of the ratchet 102. The ratchet guide lever 112 is moveable by the latch 90 in first direction (counterclockwise in FIG. 3) to the release position when the latch 90 is moved in the second direction to the overstroke position. As already mentioned, when the ratchet guide lever 112 is in the release position, the ratchet 102 is allowed or enabled to be rotatably urged toward the engaged position so that the ratchet can block or obstruct the latch 90 from returning or moving in the first direction toward or to the unlatched position. The latch 90 remains blocked until the ratchet 102 is moved to or toward the disengaged position.

More specifically, the ratchet guide lever 112 is moved by the latch 90 in the first direction when the raised portion 116 of the latch 90 engages a surface 118 of the lever 112 as the latch is moved past the latched position and toward the overstroked position. The raised portion 116 is disposed on the second leg 106 of the latch 90 adjacent the recess 96. The surface 118 is disposed along the lever 112 and spaced apart from a pivotal connection 120 of the lever to the lock body 92. The raised portion 116 forces the lever 112 toward the release position thereby releasing the ratchet 102.

The lever 112 includes a shoulder portion 122 disposed along the surface 118 and spaced from the pivotal connection 120. The shoulder portion 122 includes a flat surface 124 that engages the raised portion 126 of the ratchet 102. More particularly, the raised portion 126 is disposed on the ratchet 102 adjacent the opposing catch surface 108. When the ratchet 102 is in the disengaged position and the lever 112 is in the holding position, the shoulder portion 122 blocks or limits movement of the ratchet so that gravity cannot move the ratchet to the engaged position. When the lever 112 is moved to the release position, the shoulder portion 122 no longer obstructs the ratchet from falling into the engaged position.

Opposite the flat surface 124, the shoulder portion 122 includes a tapered surface 128. The tapered surface 128 allows the raised portion 126 to pass by the shoulder portion 122. More particularly, when the ratchet 102 is raised from the engaged position to the disengaged position, the raised portion 126 engages the tapered surface 128 thereby forcibly moving the lever 112 from the holding position toward the release position. As will be discussed in more detail below, the ratchet 102 is raised when one of the handles 70,72 is pulled and the synchronizer 74 connects the movement of the pulled handle to the rod 80 which moves rod lever 140 in the direction of arrow 210 (FIG. 5) to raise the ratchet to the disengaged position. After the raised portion 126 passes the shoulder portion 122, the lever 112 is again able to be urged to the holding position wherein the shoulder portion 122 holds the ratchet 102 in the disengaged position.

A sensor lever 142 is provided adjacent the ratchet 102 and opposite the rod lever 140. When the ratchet 102 is in the disengaged position, the sensor lever 142 is in a corresponding position and the sensor rod 86, which is connected to the sensor lever 142, mechanically communicates the unlocked status of the locking assembly 60 to the synchronizer 74. When the ratchet 102 is in the engaged position, the sensor lever 142 is in another corresponding position and the sensor rod 86 mechanically communicates the locked status of the locking assembly 60.

Figure 6:
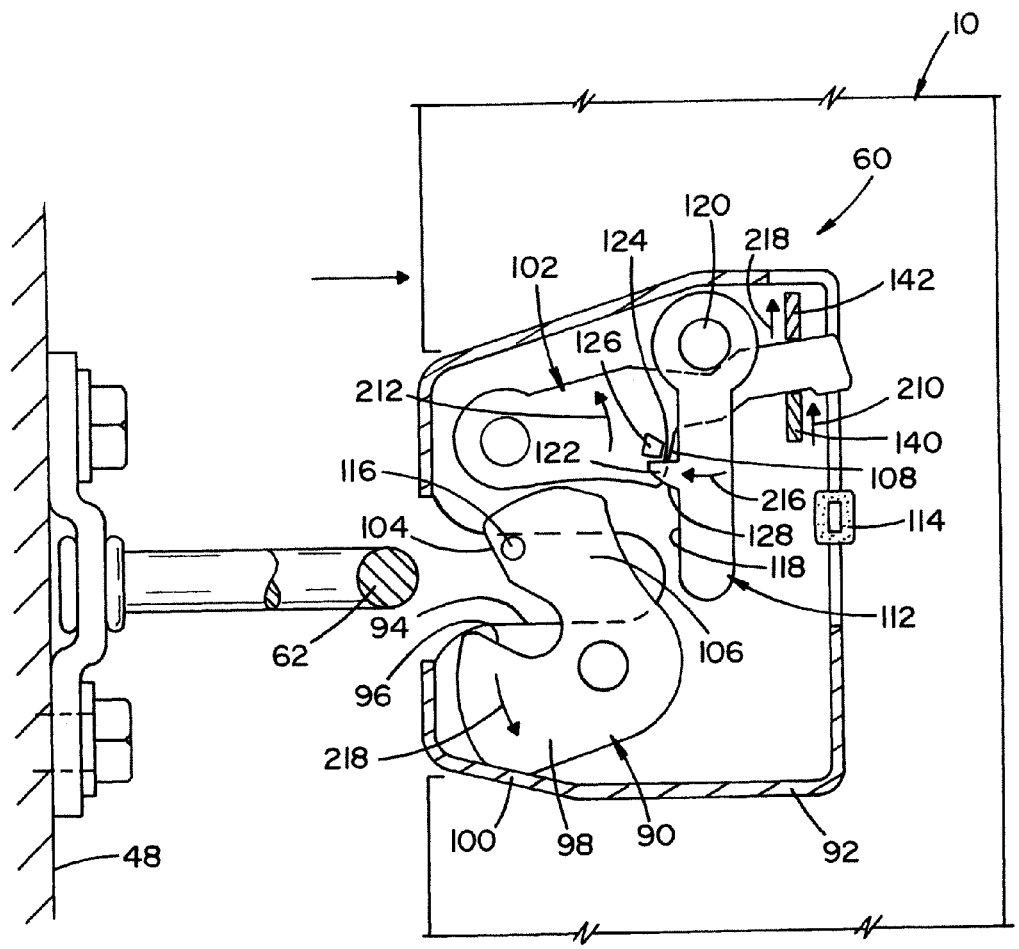
FIG. 6 is a schematic view of the lock assembly of FIG. 3 showing the lock assembly unlocked from the striker and the tailgate opening.
Figure 7:
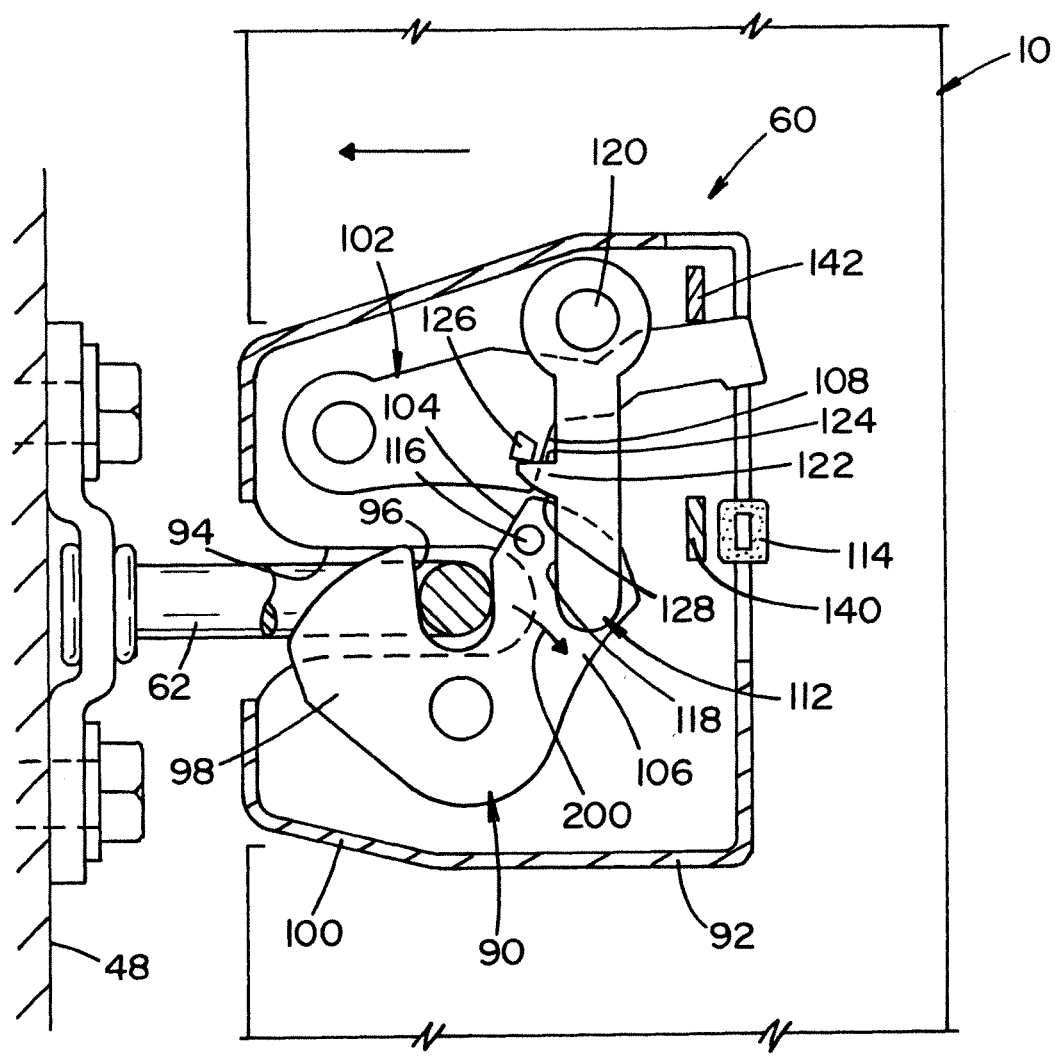
FIG. 7 is a schematic view of the lock assembly of FIG. 3 showing the lock assembly being locked onto the striker wherein a latch is in a latched position prior to overstroking and a ratchet is in a disengaged position.

In operation, when the tailgate 10 is in any open position, the lock assembly 60 is not latched or locked to the striker 62 and the latch 90, ratchet 102 and the lever 112 are in the positions shown in FIG. 6. With reference to FIG. 7, as the striker 62 and the lock body 92 of the lock assembly 60 are brought together through closing of the tailgate 10 (i.e., a force is applied to the tailgate to close the tailgate), the striker 62 enters the recesses 94,96 the latch 90 and lock body 92. Engagement between the striker 62 and the second leg 106 of the latch 90, as the striker 62 is forced into the recesses 94,96 by closure of the tailgate 10, causes the latch 90 to rotate in the second direction 200 against the urging of the latch 90 in the first direction by the spring 97. As shown in FIG. 7, the latch 90 rotates about the striker 62 to the latched position. However, because the latch 90 has yet to be overstroked, the latch 90 is not yet prevented from rotating back in the first direction by the torsion spring 97.

At the same time, the other of the hinge/lock assemblies 42,50 that was open with the lock assembly 60 to open the tailgate 10 to one of the open positions is latched and held in a latched position. Because the hinge/lock assemblies 42,50 function conventionally (i.e., do not require overstroking to latch), the open or unlatched hinge/lock assembly 42 or 50 is securely or fully latched at about the time the latch 90 of the lock assembly 60 reaches the unsecured latched position shown in FIG. 7. Continuing to bring the striker 62 and the lock body 92 together, such as by further closing the tailgate 10, causes the striker 62 to penetrate further into the lock body recess 94 and further rotate the latch 90 in the direction 200 to the overstroked position shown in FIG. 8. When the ratchet 102 moves to the engaged position, the sensor lever 142 moves in the direction of arrow 205 thereby pulling the rod 86 from the synchronizer 74 to mechanically communicate to the synchronizer that the locking assembly 60 is now locked. The sensor lever 142 can be urged toward the position shown in FIG. 8 so that when the ratchet moves to the engaged position, the sensor lever is forced to rotate thereby pulling the rod 86. Alternatively, the sensor lever 80 could be connected to the ratchet 102 so that movement of the ratchet is directly transferred into movement of the sensor lever 142.

Figure 8:
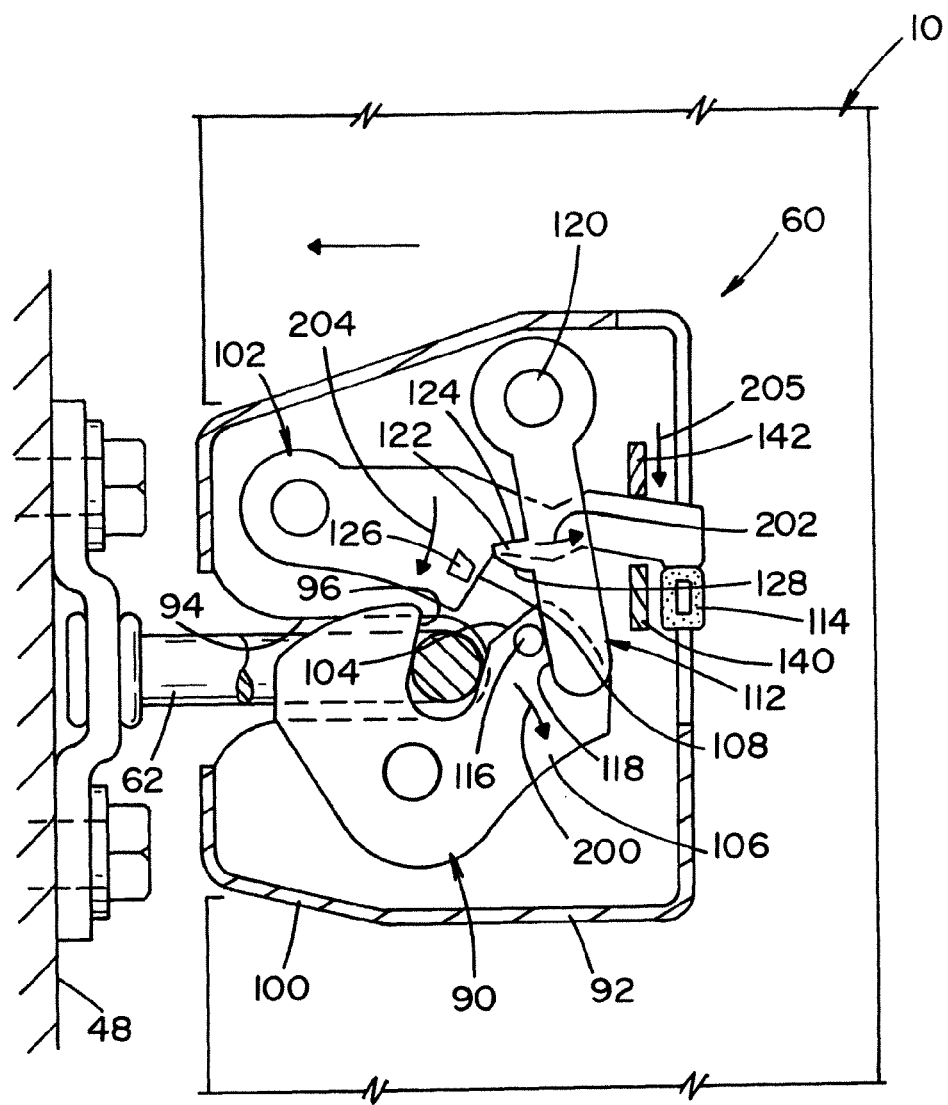
FIG. 8 is a schematic view of the lock assembly of FIG. 3 showing the lock assembly being locked onto the striker wherein the latch is in overstroked position and the ratchet is in an engaged position.

While the striker 62 moves the latch 90 into the overstroke position, the raised portion 116 of the latch 90 engages the surface 118 of the lever 112 and moves the lever 112 from the holding position of FIG. 7 to the release position of FIG. 8, as indicated by arrow 202. As the lever 112 moves to the release position, the shoulder portion 122 is removed from obstructing movement of the ratchet 102 in the second direction, indicated by arrow 204, as urged by the spring 110. Thus, once the shoulder portion 122 is moved away from the raised portion 126 of the ratchet 102, the ratchet moves from the disengaged position shown in FIG. 7 to the engaged position shown in FIG. 8.

With the ratchet 102 in the engaged position, the force applied to the tailgate 10 to close the tailgate is no longer needed. Without a force applied, the striker 62 no longer rotates the latch 90 thereabout and, with reference to FIG. 9, the latch is again urged in the first direction 206 by the biasing means 97. The catch surface 104 of the latch 90 engages the opposing catch surface 108 of the ratchet 102 which holds the latch 90 in the latched position. As long as the ratchet 102 remains in the engaged position, the latch 90 is held in the latched position thereby latching onto the striker 62 and locking the striker to the lock body 92 of the locking assembly 60. As shown, the ratchet guide lever 112 is able to return to the holding position, as indicated by arrow 208, after the raised portion 126 of the ratchet 102 clears the shoulder portion 122 of the lever.

Figure 9:
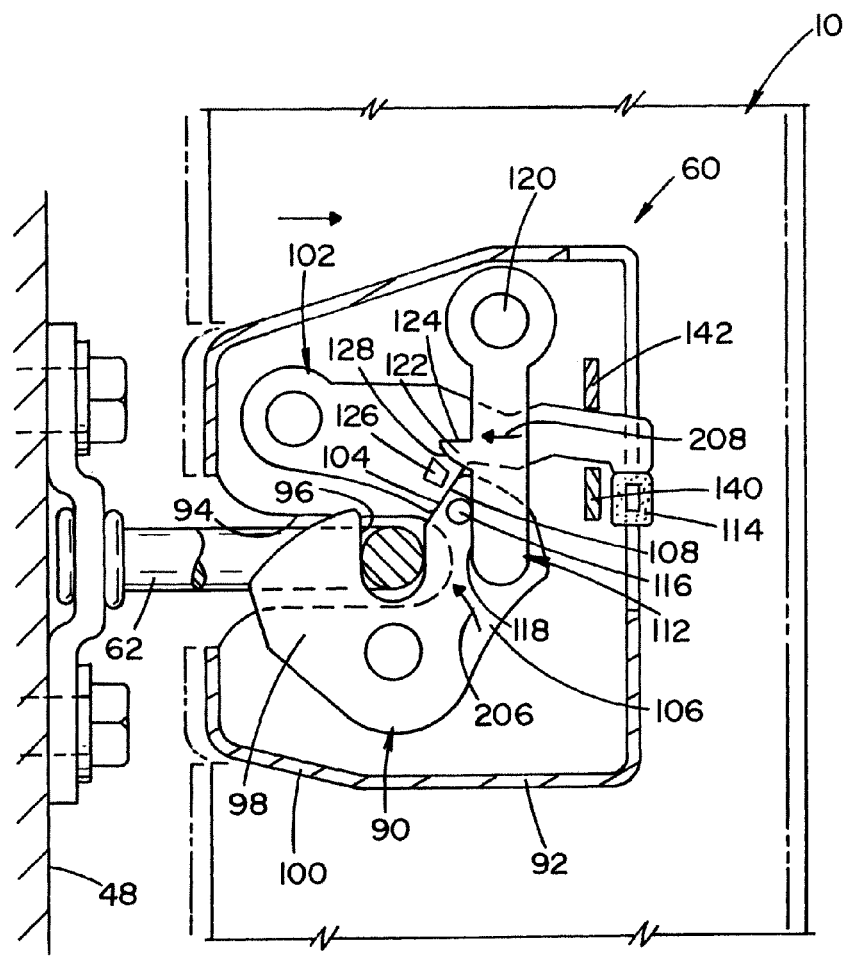
FIG. 9 is a schematic view of the lock assembly of FIG. 3 showing the locking assembly locked onto the striker.

To unlock or unlatch the lock assembly 60 from the striker 62, the ratchet 102 is moved from the engaged position of FIG. 9 to the disengaged position of FIG. 6. Specifically, with reference to FIGS. 5 and 6, when one of the handles 70,72 is pulled while the handles are enabled, the pulled handle's stroke is connected by the synchronizer 74 to the rod 80 so that the rod 80 raises the ratchet 102 to the disengaged position via the rod lever 140. Thus, rod 80 is moved toward the locking assembly 60 by the synchronizer 74 which moves rod lever 140 in the direction of arrow 210 to move the ratchet 102 in the direction of arrow 212. As already discussed, when the ratchet 102 is moved to the disengaged position, the raised portion 126 of the ratchet 102 engages the tapered surface 128 of the lever 112 to forcibly move the lever in the direction of arrow 214 toward the release position thereby allowing the raised portion 126 to pass the shoulder portion 122. Once raised portion 126 clears the shoulder portion 122, the lever 112 returns to the holding position, as indicated by arrow 216, wherein the lever prevents the ratchet from returning to the engaged position. With the ratchet 102 in the disengaged position, the latch 90 is rotated back in the direction of arrow 218 to the unlatched position of FIG. 6, wherein the latch first leg 98 engages the wall 100 of the lock body 92 which unlatches or unlocks the striker 62 and allows the striker to be removed from the lock body 92 of the locking assembly 60. When the ratchet moves to the disengaged position, the sensor lever 142 is moved in the direction of arrow 218 to communicate to the synchronizer 74 that the locking assembly 60 is unlocked.

As will be appreciated by those skilled in the art, the position of the ratchet 102 corresponds to the state of the locking assembly 60, i.e., locked to or unlocked from the striker 62. When the ratchet is in the disengaged position, the latch 90 is urged toward the unlatched position and is held in the unlatched position by engagement with the wall 100. When the ratchet 102 is in the engaged position, the latch 90 is urged toward and is held by the ratchet in the latched position. Thus, the position of the ratchet 102 can be used as an indicator of the status of the latch 90 and, more generally, the status of the locking assembly 60. Using the position of the ratchet 102, the sensor rod 86 communicates the status of the lock assembly 60 to the synchronizer 74. More particularly, the sensor lever 142 is in a position corresponding the ratchet's position. The sensor lever 142 is pivotally connected to the sensor rod 86 and thereby communicates the ratchet's position to the sensor rod. Thus, when the ratchet 102 is in the engaged position, the sensor lever 142 falls or is urged toward the stopper 114 with the ratchet 102 and the rod 86 moves to communicate the ratchet's position (and the latched state of the latch) to the synchronizer 74. When the ratchet 102 is in the disengaged position, the sensor lever 142 is moved upward by the ratchet 102 and again the rod 86 moves to communicate the ratchet position (and the unlatched state of the latch) to the synchronizer 74.

As already described, when the sensor rod 86 indicates to the synchronizer 74 that the latch 90 and locking assembly 60 are unlocked from the striker 62 (i.e., ratchet in disengaged position), the synchronizer disables the handles 70,72 thereby preventing unlatching of hinge/lock assembly 42,50 still connected to the vehicle V. When the sensor rod 86 indicates that the latch 90 and locking assembly 60 are locked to the striker 62 (i.e., ratchet in engaged position), the synchronizer 74 enables the handles 70,72 allowing pulling of one of the handles to unlatch the locking assembly 60 and one of the hinge/lock assemblies 42 or 50. The synchronizer 74 prevents simultaneous operation of the handles 70,72, even when the handles are enabled.

According to another embodiment, the latch assembly, including latch 90, lock body 92, ratchet 102 and lever 112, is used with a striker, such as striker 62, to latch first and second bodies together when at least one of the bodies is movable relative to the other of the bodies. For example, the first body could be the tailgate 10 to which the latch assembly 90,92 is mounted and the second body could be the vehicle V to which the striker 62 is mounted. As described above, the latch 90 is moveable to the latched position from the unlatched position and, to maintain the latch in the latched position, the latch is moveable to the overstroked position before returning to the latched position. Generally, to move the latch 90 from the unlatched position to the latched position and to the overstroked position, at least one of the bodies, such as the tailgate 10, is moved toward the other of the bodies, such as the vehicle V. The latch 90 reaches the overstroked position when at least one of the bodies, such as the tailgate 10, reaches a predetermined position, such as a fully closed position, relative to the other of the bodies, such as the vehicle V.

When the latch 90 is overstroked, the ratchet 102 moves to the engaged position to hold the latch in the latched position. More particular, as described in more detail above, the latch 90 moves the lever 112 to the release position which allows the ratchet to move into the engaged position. In the engaged position, the ratchet 102 prevents the latch 90 from moving beyond the latched position. In the latched position, the latch locks onto the striker 62 which thereby locks the first and second bodies, such as the tailgate 10 and the vehicle V, together. After latching, the ratchet 102 can be moved from the engaged position to the disengaged position to again allow the latch 90 to return to the unlatched position thereby allowing at least one of the first and second bodies to be moved relative to the other of the bodies.

The exemplary embodiment has been described with reference to the embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A latch assembly for selectively locking a closure assembly and a vehicle body together, said latch assembly comprising:
    a striker being mounted to one of said closure assembly and said vehicle body; and
    a latch being mounted to the other of said closure assembly and said vehicle body, said latch having a latch recess into and from which said striker is movable as said closure assembly is moved relative to said vehicle body when said latch is in an unlatched position, said latch moveable to a latched position wherein said latch locks onto said striker thereby locking said closure assembly and said vehicle body together, said latch movable from said unlatched position to said latched position and lockable in said latched position only after said latch is overstroked beyond said latched position, said latch not lockable in said latched position if said latch is not overstroked beyond said latched position.

2. The latch assembly of claim 1 further including a ratchet moveable between an engaged position wherein said ratchet holds said latch in said latched position and a disengaged position wherein said ratchet allows said latch to move between said unlatched and said latched positions, said ratchet moveable from said disengaged position to said engaged position only after said latch is overstroked.

3. The latch assembly of claim 2 wherein said latch is rotatably urged in a first direction toward said unlatched position and engagement between said striker and said latch rotates said latch in a second direction toward an overstroked position to overstroke said latch and allow said ratchet to move from said disengaged position to said engaged position.

4. The latch assembly of claim 3 wherein said engagement occurs when said closure assembly is moved toward said vehicle body and said latch reaches said overstroked position when said closure assembly is at a predetermined position relative to said vehicle body.

5. The latch assembly of claim 2 further including a ratchet guide lever holding said ratchet in said disengaged position until said latch is overstroked which thereby moves said ratchet guide lever and allows said ratchet to moved to said engaged position.

6. The latch assembly of claim 1 wherein said latch locks onto said striker thereby locking said closure assembly and said vehicle body together only after said latch is overstroked.

7. A latch assembly for a vehicle's closure assembly, said closure assembly mounted on a vehicle and moveable between a closed position and an open position, said latch assembly comprising:
a lock assembly selectively locking said closure assembly to the vehicle when said closure assembly is in said closed position, said lock assembly including a latch that that locks said closure assembly in said closed position when said latch is in a latched position, said latch requires rotatable overstroking past said latched position to lock said latch in said latched position and thereby lock said closure in said closed position, said latch not lockable in said latched position if said latch is not overstroked beyond said latched position.

8. The latch assembly of claim 7 wherein said latch is mounted to one of said closure assembly and said vehicle, said lock assembly further including a striker being mounted to the other of said closure assembly and said vehicle, said striker movable into and from a latch recess defined in said latch as said closure assembly is moved relative to said vehicle when said latch is in an unlatched position, and said latch locks onto said striker when said striker is received in said latch recess and said latch is moved into said latched position.

9. The latch assembly of claim 7 wherein said closure assembly is a dual-mode tailgate adapted to be mounted along an open edge of a load-carrying bed of the vehicle, said tailgate is alternatively pivotable about (1) a first axis generally parallel with a bottom edge of the tailgate for movement between a closed position and a fold-open position and (2) a second axis generally parallel with a first lateral edge of the tailgate for movement between the closed position and a swing-open position.

10. The latch assembly of claim 9 further including a second lock assembly selectively locking said tailgate to the vehicle, and wherein one of said lock assembly and said second lock assembly is a locking assembly selectively latched to an associated locking striker and the other of said lock assembly and said second lock assembly is a first hinge/lock assembly selectively latched to an associated first hinge/lock striker on the vehicle and cooperating with a dual-mode hinge assembly to pivotally support the tailgate about a first pivot axis.

11. The latch assembly of claim 10 further including a second hinge/lock assembly selectively latched to an associated second hinge/lock striker on the vehicle and cooperating with the dual-mode hinge assembly to pivotally support said tailgate about a second pivot axis, said tailgate openable to said fold-open position when said second hinge/lock assembly and said locking assembly are unlatched from respective associated strikers and openable to said swing-open position when said first hinge/lock assembly and said locking assembly are unlatched from respective associated strikers.

12. The latch assembly of claim 7 wherein the lock assembly is a first lock assembly and the latch assembly further includes:
a second lock assembly selectively locking said closure assembly to the vehicle when said closure is in said closed position, said second lock assembly including a latch that locks said closure in said closed position when said latch of said second lock assembly is locked in said latched position;
a sensor that determines whether said first lock assembly is locking said closure in said closed position wherein said latch of said first lock assembly is locked in said latched position only after being overstroked; and
a synchronizer operatively connected to each of said first lock assembly, said second lock assembly and said sensor, said synchronizer preventing said latch of said second lock assembly from being unlatched thereby unlocking said closure from the vehicle when said sensor determines that said latch of said first lock assembly is in said unlatched position.

13. A latch assembly for locking a closure to a vehicle body, comprising:
a first striker mounted to said closure or to said vehicle body;
a first lock assembly mounted to said closure when said first striker is mounted to said vehicle body and mounted to said vehicle body when said first striker is mounted to said closure, said first lock assembly selectively latched to said first striker;
a second striker mounted to said closure or to said vehicle body; and
a second lock assembly mounted to said closure when said second striker is mounted to said vehicle body and mounted to said vehicle body when said second striker is mounted to said closure, said second lock assembly selectively latched to said second striker, said first lock assembly latching to said first striker after said second lock assembly latches to said second striker when said closure is moved from an open position to a closed position,
wherein said first lock assembly includes a latch requiring an overstroke to lock onto said first striker, said second lock assembly latching to said second striker before said overstroke of said latch when said closure is moved from said open position to said closed position.

14. The latch assembly of claim 13 wherein said first lock assembly includes said latch having a latch recess for receiving said first striker when said latch is in an unlatched position, said latch moveable to a latched position wherein said latch locks to said first striker.

15. The latch assembly of claim 13 further including:
a sensor that determines whether said first lock assembly is latched to or unlatched from said striker; and
a means for preventing said second lock assembly from unlatching from said second striker when said sensor determines that said first lock assembly is unlatched from said first striker.

16. The latch assembly of claim 13 further including:
- a sensor that determines whether said first lock assembly is latched to or unlatched from said first striker; and
- a synchronizer operatively connected to said sensor and to said second lock assembly that selectively disables said second lock assembly from unlatching from said second striker when said sensor determines that said first lock assembly is unlatched from said first striker.

17. The latch assembly of claim 16 further including a sensor rod extending between said first locking assembly and said synchronizer for communicating to said synchronizer whether said first lock assembly is latched to or unlatched from said first striker.

18. A vehicle closure assembly having a latching assembly for selectively locking the closure assembly, comprising:
- a closure structure mounted to an associated vehicle for movement between a closed position and an open position;
- a first lock assembly selectively locking said closure structure to said associated vehicle in said closed position; and
- a second lock assembly selectively locking said closure structure to said associated vehicle in said closed position, wherein one of said first and second lock assemblies includes a latching assembly having a latch that requires overstroking to lock said latch in a latched position and the other of said first and second lock assemblies includes a latching assembly having a latch that does not require overstroking to lock.

19. The vehicle closure assembly of claim 18 further including a striker mounted on one of said closure structure and said associated vehicle, said latching assembly having said latch mounted to the other of said closure structure and said associate vehicle, said striker movable into and from a latch recess defined in said latch as said closure structure is moved to and from said closed position, said latch locks onto said striker when said striker is received in said latch recess and said latch is moved into said latched position after being overstroked.

20. The vehicle closure assembly of claim 18 wherein said latching assembly includes a ratchet moveable between an engaged position wherein said ratchet holds said latch in said latched position and a disengaged position wherein said ratchet allows said latch to move between an unlatched position and said latched position, said ratchet only moveable from said disengaged position to said engaged position after said latch is overstroked, wherein said latch is rotatably urged in a first direction toward said unlatched position and engagement between said striker and said latch rotates said latch in a second direction toward an overstroked position to overstroke said latch and allow said ratchet to move from said disengaged position to said engaged position, said engagement occurring when said closure structure is moved toward said associated vehicle and said latch reaches said overstroked position when said closure structure is at a predetermined position relative to said associated vehicle.

21. The closure assembly of claim 20 wherein said latching assembly further includes a ratchet guide lever holding said ratchet in said disengaged position until said latch is overstroked which thereby moves said ratchet guide lever and allows said ratchet to moved to said engaged position.

* * * * *

UNITED STATES PATENT AND TRADEMARK OFFICE
CERTIFICATE OF CORRECTION

PATENT NO.        : 8,469,409 B2
APPLICATION NO.   : 11/756565
DATED             : June 25, 2013
INVENTOR(S)       : Matthew Plett et al.

Page 1 of 1

It is certified that error appears in the above-identified patent and that said Letters Patent is hereby corrected as shown below:

Title page, item (63) should read -- Divisional of application No. 10/894,631, filed on Jul. 20, 2004, now Pat. No. 7,243,973

Signed and Sealed this
Twenty-sixth Day of November, 2013

Margaret A. Focarino
*Commissioner for Patents of the United States Patent and Trademark Office*